J. M. LAFFEY.
FEEDING PAN FOR HUSKERS.
APPLICATION FILED MAR. 1, 1920.

1,368,266.

Patented Feb. 15, 1921.
2 SHEETS—SHEET 1.

INVENTOR
Joseph M. Laffey,
BY
Paul M. Klein
ATTORNEY

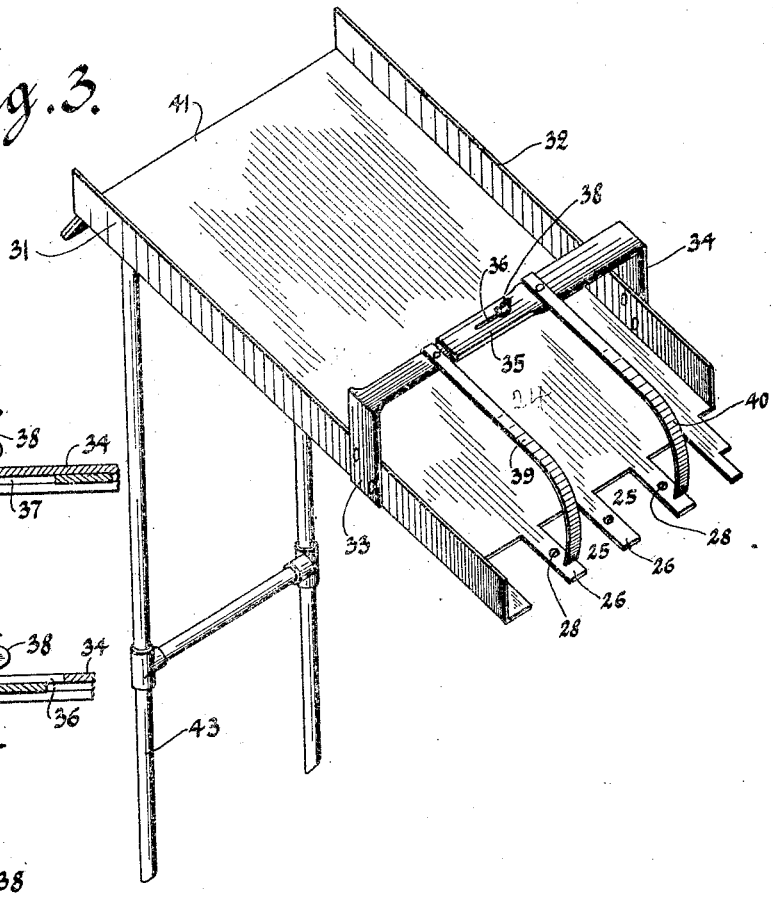
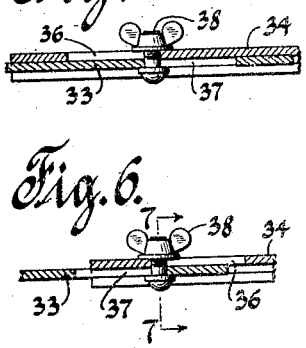
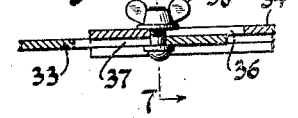
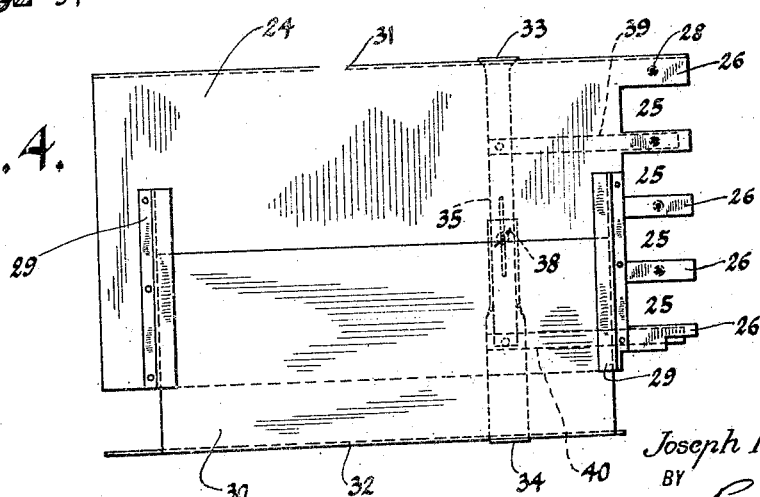

UNITED STATES PATENT OFFICE.

JOSEPH M. LAFFEY, OF CHATFIELD, MINNESOTA.

FEEDING-PAN FOR HUSKERS.

1,368,266.   Specification of Letters Patent.   Patented Feb. 15, 1921.

Application filed March 1, 1920. Serial No. 362,510.

*To all whom it may concern:*

Be it known that I, JOSEPH M. LAFFEY, citizen of the United States, and resident of Chatfield, in the county of Olmsted and State of Minnesota, have invented certain new and useful Improvements in Feeding-Pans for Huskers, of which the following is a specification.

This invention relates to feeding pans for corn huskers.

One of the objects of my invention is to provide an automatic feed of corn ears to the husker mechanism.

Another object of my invention is to provide a device by means of which corn ears may be fed into a husker in such a way as to permit no more than one ear to be engaged by the husker-knives at one time.

A still further object of my device is to provide means by which a plurality of corn ears may be placed and held in storage for the husker mechanism while new supply is brought in for the husking operation.

In order to point out the advantages and other objects of my invention, it is in place to explain the prevailing method used at present.

Huskers now in use are either equipped with a complicated and expensive corn hopper mechanism, or very often lack any provision for retaining and properly discharging corn to the husker feeder.

The latter case is particularly evident in small cheap machines where it becomes necessary to feed corn ears to the feeding mechanism by hand, since it would be too costly to install an expensive hopper.

The feeding mechanism usually consists of a plurality of feeding blades operating on chain and sprocket principle and adapted to engage one ear at a time.

The efficiency of hand feeding depends entirely upon the skill of the operator, and when the ears are not placed properly or on time in the path of the feeding blades, the ears are either cut or otherwise prevented from being fed orderly to the husking mechanism.

My invention fills the demand for an inexpensive and simple feed hopper for corn huskers.

The foregoing and further objects will be more fully apparent from the following specification and the drawings, forming a part thereof, in which:

Fig. 3 is a perspective view of my device.

Fig. 4 is a bottom view of my device in extended position.

Fig. 5 is a detail cross-sectional view of the adjusting mechanism in closed position.

Fig. 6 is the same in extreme open position.

Fig. 7 is a sectional view taken on line 7—7 of Fig. 6.

Figure 1:
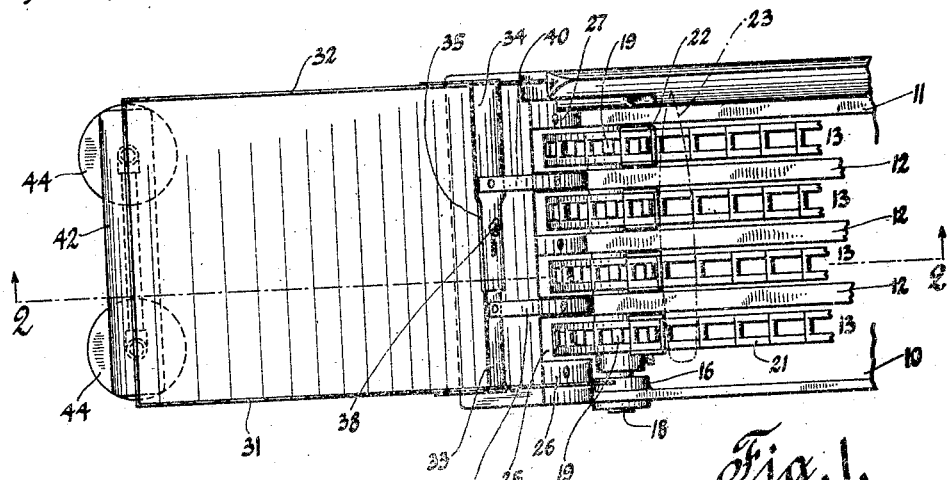
Figure 1 is a top view showing part of a husker to which my device is attached.

Referring to the drawings, 10 designates a part of the husker frame comprising a table 11 divided through ribs 12 into compartments 13. The ribs extend to the front guard 14 and widen at 15 to bearing lugs 16. The upper part of the widened ribs terminate into inclined partitions 17.

The lugs 16 are adapted to receive a shaft 18 to which are keyed sprocket wheels 19. Each sprocket is driven by link chain 20. The chain consists of a plurality of links 21 and so called "feeding blades" 22 which are arranged intermediately between a certain number of links so that the knives are equally distanced from each other. These feeding blades, taking the place of a link, travel within the compartments 13 and, when reaching the position indicated in dotted lines at 22′, are to convey one corn ear at the time to the husking mechanism, not shown in the drawings.

As has been said previously, the ears are ordinarily placed upon the husker table in front of the inclined partitions 17, and, because of the rapid movement of the feeding blades, there is little time left for positioning the ears in correct relation to the feeding blades so that they may be conveyed by the latter in the manner indicated in Fig. 1 in dashed and dotted lines at 23.

In order to facilitate the proper feeding of the ears to the feeding blades and to enable the operator to store enough ears for the feeding of the husker during his absence, I have provided a device comprising a stationary member 24, cut-out at 25 to correspond with the compartments 13 of the husker. Tongues 26 register with the widened inclined rib-ends 17 and are attached to them by screws 27 or other convenient means passing through apertures 28.

Sliding in guides 29 provided at the bottom part of pan-member 24 is an adjustable pan-member 30 (see Fig. 4), which may be drawn out or brought in closed position as may be seen in Fig. 3, depending upon the size of ears to be handled.

Riveted or otherwise attached to the upturned sides 31 and 32 of the pan-members are the arms 33 and 34 of the adjusting bridge 35, the ends of which are slotted as indicated at 36 and 37. Passing through the slots is a bolt 38 provided with washers and a wing-nut for fastening the bridge arms together at any desired position.

Each bridge-arm is provided with a flexible blade 39 and 40, made preferably of spring steel and reaching from the bridge in an arc toward two of tongues 26. In the drawings are shown but two such blades, and it is self understood that any number of springs may be attached according to the design of the husker.

As may be seen in Figs. 5, 6 and 7, the ends of the bridge-arms are guided.

When the width of the pan is increased, the blade 39 remains stationary with the bridge-arm 33 of the pan-member 24, while the blade 40 moves with the bridge-arm 34 attached to the sliding pan-member 30 until it reaches a position above the last tongue adjacent to the flat end of the stationary pan-member, as may be seen in Fig. 4.

Being fastened to the inclined portion of the rib-extension 17, the rear end 41 is elevated and requires a support indicated at 42. This consists of a standard 43, made preferably of piping, with a base or bases 44 and angular seat 45 to which the pan may be attached if so desired.

In operation, my device is very simple, nevertheless highly efficient as to saving of time and material and as to properly feeding the husker mechanism.

The pan, once adjusted and fastened to the husker may be permanently used for the purpose it is intended.

A number of ears are placed into the pan, preferably parallel to its short sides, although the ears will assume their correct position even if deposited in disorder, due to gravity and the arrangement of the flexible blades 39 and 40.

Figure 2:
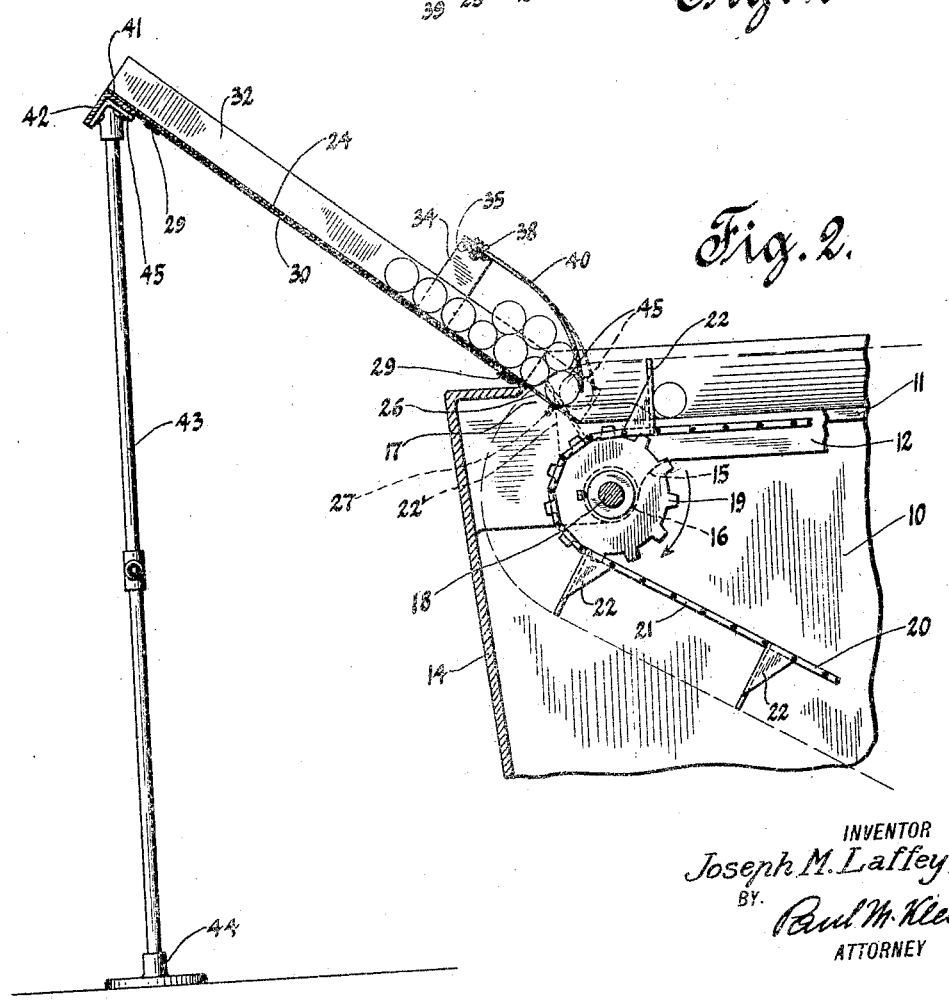
Fig. 2 is a sectional view taken on line 2—2 of Fig. 1.

At the point where the blades come nearest to the tongues 26 the lowest ear 45 is held in perfect horizontal position ready to be engaged by the feeding blades. Between the flexible blades and tongues is room but for one single corn. When the feeding blades reach the position indicated at 22' in Fig. 2 and press against the ear, the flexible blades give enough to permit same to pass out.

Immediately after releasing the lowest ear the spring blades snap back in their original position, and another ear rolls down between the flexible blades and tongues by force of gravity.

My primary object is to provide a suitable device for the purpose of feeding corn ears into huskers and I reserve the right to make changes and improvements on same within the scope of my invention, for which I claim:

1. A feeding pan for corn huskers comprising a stationary member adapted to be permanently attached to a husker, a movable sliding member, means for guiding said sliding member, means for arresting the slidable member at any desired position in relation to said stationary member, projecting tongues with intervening open spaces provided at the delivering end of said stationary member, and spring divides attached to said arresting means for holding a corn ear in place prior to its forcible removal by the husker mechanism.

2. In a feeding pan for huskers, the combination with a stationary inclined pan member having projecting tongues with intervening open spaces, said open spaces adapted to facilitate the passage therethrough of the feeding blades of the husker, a sliding pan member guided at the bottom of said stationary member, an adjusting bridge connecting said stationary and said sliding pan members for holding them spaced when desired, spring guards attached to said bridge for preventing corn ears from voluntarily leaving the pan, permitting, however, said ears to be engaged singly by the husker feeding blades and to leave the pan one by one.

3. A feed attachment for corn huskers, comprising stationary and sliding pan parts, guiding means integral with the stationary part adapted to receive said sliding part, an adjusting bridge comprising two arms, one of which is connected with the stationary pan-part, the other with the sliding pan-part, means for longitudinally guiding the free ends of said adjusting bridge, slots provided at both ends, thereof, clamping means passing through said slots for firmly holding the pan-parts in position, a pair of spring guards each attached individually to one arm of the adjusting bridge, and means for supporting the free end of the pan.

4. A feed attachment for a corn husker, comprising a pan formed of laterally adjustable sections; one of said sections having on one end thereof projecting tongues with intervening open spaces, and each of said sections having a downwardly, projecting flexible blade connected therewith.

5. A feed attachment for a corn husker, comprising a corn feeding pan having laterally adjustable sections for receiving a plurality of corn ears, and flexible blades attached to each section, facilitating the feeding to the husker of but one ear at the time.

6. A feed attachment for a corn husker, comprising a corn receiving pan having adjustable sections, and flexible means provided above the pan for preventing more than one ear from being fed to the husker mechanism at one time.

Signed at Chatfield, in the county of Olmsted, and State of Minnesota.

JOSEPH M. LAFFEY.